US008185948B2

(12) United States Patent
Uruta et al.

(10) Patent No.: US 8,185,948 B2
(45) Date of Patent: May 22, 2012

(54) IMAGE FORMING APPARATUS CAPABLE OF ALLOWING EASY OPERATION OF DATA WHILE MAINTAINING CONFIDENTIALITY

(75) Inventors: Hiroya Uruta, Tokyo (JP); Nobuyuki Iwata, Kanagawa (JP); Naruhiko Ogasawara, Chiba (JP); Takahiro Hirakawa, Kanagawa (JP); Naohiko Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1103 days.

(21) Appl. No.: 11/717,132

(22) Filed: Mar. 13, 2007

(65) Prior Publication Data
US 2007/0214494 A1 Sep. 13, 2007

(30) Foreign Application Priority Data

Mar. 13, 2006 (JP) ................................. 2006-067234

(51) Int. Cl.
*G06F 21/00* (2006.01)
(52) U.S. Cl. ............................. 726/17; 726/28; 713/182
(58) Field of Classification Search .................... 726/17, 726/28; 713/182
See application file for complete search history.

(56) References Cited

U.S. PATENT DOCUMENTS

| | | | | |
|---|---|---|---|---|
| 6,862,583 | B1* | 3/2005 | Mazzagatte et al. | 705/64 |
| 7,586,651 | B2* | 9/2009 | Kurihara | 358/3.23 |
| 2004/0246504 | A1* | 12/2004 | Mitsubori | 358/1.1 |
| 2005/0015779 | A1* | 1/2005 | Christiansen | 719/327 |
| 2005/0046875 | A1* | 3/2005 | Gibson | 358/1.1 |
| 2005/0105122 | A1* | 5/2005 | Sakai | 358/1.14 |
| 2005/0203805 | A1* | 9/2005 | Clough et al. | 705/26 |
| 2005/0225789 | A1* | 10/2005 | Ferlitsch | 358/1.13 |
| 2005/0265744 | A1* | 12/2005 | Uruta | 399/80 |
| 2005/0273616 | A1* | 12/2005 | Nishio | 713/176 |
| 2005/0275678 | A1* | 12/2005 | Ferlitsch | 347/19 |
| 2005/0286071 | A1* | 12/2005 | Faynor | 358/1.15 |
| 2006/0001897 | A1* | 1/2006 | Ogasawara | 358/1.13 |
| 2006/0132815 | A1* | 6/2006 | Lofthus et al. | 358/1.13 |
| 2006/0132823 | A1* | 6/2006 | Sakamoto | 358/1.14 |
| 2006/0152758 | A1* | 7/2006 | Owen | 358/1.15 |
| 2006/0259964 | A1* | 11/2006 | Maldonado et al. | 726/16 |
| 2007/0076238 | A1* | 4/2007 | Odagiri | 358/1.14 |

FOREIGN PATENT DOCUMENTS

| | | |
|---|---|---|
| JP | 2004-289302 | 10/2004 |
| JP | 2005-149088 | 6/2005 |
| JP | 2006041717 A * | 2/2006 |

OTHER PUBLICATIONS

U.S. Appl. No. 11/171,349.

* cited by examiner

*Primary Examiner* — Michael Pyzocha
(74) *Attorney, Agent, or Firm* — Dickstein Shapiro LLP

(57) ABSTRACT

An image forming apparatus which requests authentication for login processing based on user information when a user requests specific processing includes a communication interface for receiving data, a print mechanism for performing printing processing on data, a registration mechanism for registering a plurality of user information, a storage mechanism for storing an access control list and an administration mechanism. The administration mechanism administers login processing of a plurality of users based on hierarchy information of the registered users and registered contents of the access control list, and to administer permission of the operation processing requested by the user. When the user instructs specific processing of data which is a guest job having no authentication information, the processing of the data is carried out.

6 Claims, 13 Drawing Sheets

FIG. 4A

| SETTING | BROWSE BIBLIOGRAPHIC INFORMATION | PRINT | CHANGE DOCUMENT NAME | DELETE | CHANGE DOCUMENT PASSWORD | SET ACL |
|---|---|---|---|---|---|---|
| LEVEL 1 | YES | YES | NO | NO | NO | NO |
| LEVEL 2 | YES | YES | YES | NO | NO | NO |
| LEVEL 3 | YES | YES | YES | YES | NO | NO |
| LEVEL 4 | YES | YES | YES | YES | NO | YES |

FIG. 4B

| USER | BROWSE BIBLIOGRAPHIC INFORMATION | PRINT | CHANGE DOCUMENT NAME | DELETE | CHANGE DOCUMENT PASSWORD | SET ACL |
|---|---|---|---|---|---|---|
| OWNER | YES | YES | YES | YES | YES | YES |
| DOCUMENT ADMINISTRATOR | YES | NO | NO | YES | YES | YES |

FIG. 4C

| JOB TYPE | ALL USERS | | DOCUMENT ADMINISTRATOR |
|---|---|---|---|
| GUEST JOB | OWNER | — | DOCUMENT ADMINISTRATOR |
| PUBLIC JOB | READING | OWNER | DOCUMENT ADMINISTRATOR |

FIG. 5A

| REGISTERED USER NAME | AUTHORIZATION LEVEL |
|---|---|
| User01 | LEVEL 1 |
| User02 | LEVEL 1 |
| User03 | LEVEL 1 |
| ... | ... |

FIG. 5B

| REGISTERED USER NAME | AUTHORIZATION LEVEL |
|---|---|
| User01 | LEVEL 2 |
| User02 | LEVEL 1 |
| User03 | LEVEL 4 |
| ... | ... |

FIG. 6A

| REGISTERED USER NAME | AUTHORIZATION LEVEL |
|---|---|
| User01 | OWNER |
| User02 | OWNER |
| User03 | OWNER |
| ... | ... |

FIG. 6B

| REGISTERED USER NAME | AUTHORIZATION LEVEL |
|---|---|
| User01 | LEVEL 4 |
| User02 | LEVEL 4 |
| User03 | LEVEL 4 |
| ... | ... |

FIG. 6C

| REGISTERED USER NAME | AUTHORIZATION LEVEL |
|---|---|
| User01 | LEVEL 3 |
| User02 | LEVEL 3 |
| User03 | LEVEL 3 |
| ... | ... |

FIG. 8A

| DOCUMENT INFORMATION | MEETING MINUTES |
|---|---|
| | User01 |
| | PW01 |
| | 2005/09/13 |
| | SAVED DOCUMENT |
| | 5 |
| | User13 |
| | PW13 |
| | NONE |
| | — |
| | ... |

FIG. 8B

| DOCUMENT INFORMATION | MEETING MINUTES |
|---|---|
| | User01 |
| | — |
| | 2005/09/13 |
| | SAVED DOCUMENT |
| | 5 |
| | — |
| | — |
| | — |
| | ... |

FIG. 8C

| DOCUMENT INFORMATION | MEETING MINUTES |
|---|---|
| | User01 |
| | PW01 |
| | 2005/09/13 |
| | SAVED DOCUMENT |
| | 5 |
| | — |
| | — |
| | — |
| | ... |

FIG. 9A

| DOCUMENT INFORMATION | MEETING MINUTES |
|---|---|
| | User01 |
| | PW01 |
| | 2005/09/13 |
| | SAVED DOCUMENT |
| | 5 |
| | User13 |
| | PW13 |
| | YES |
| | — |
| | ... |

FIG. 9B

| DOCUMENT INFORMATION | MEETING MINUTES |
|---|---|
| | User01 |
| | PW01 |
| | 2005/09/13 |
| | SAVED DOCUMENT |
| | 5 |
| | User13 |
| | PW13 |
| | YES |
| | LEVEL 1 |
| | ... |

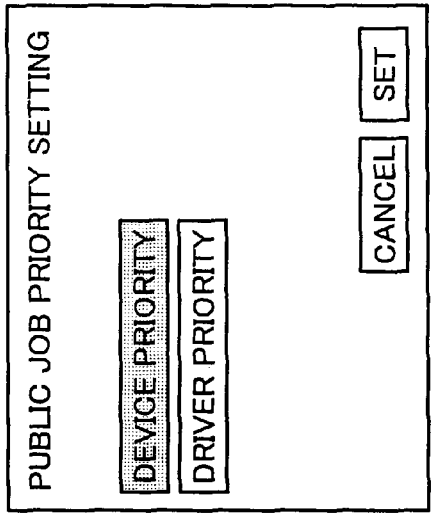
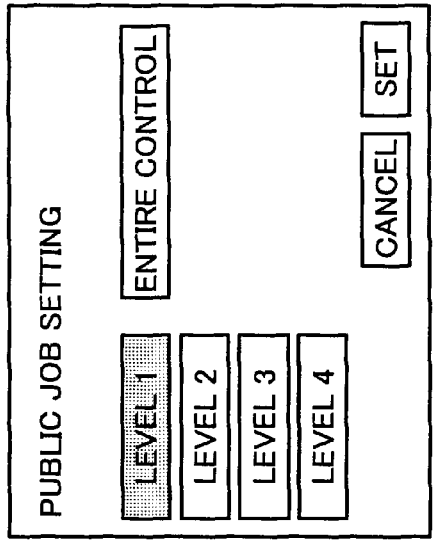
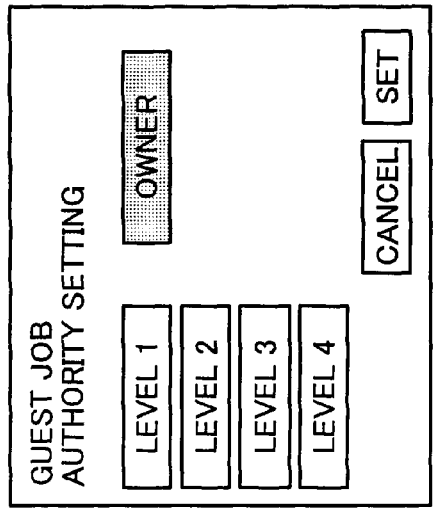

IMAGE FORMING APPARATUS CAPABLE OF ALLOWING EASY OPERATION OF DATA WHILE MAINTAINING CONFIDENTIALITY

CROSS REFERENCE TO RELATED APPLICATIONS

This patent specification is based on and claims priority to Japanese patent application, No. JP2006-067234 filed on Mar. 13, 2006 in the Japan Patent Office, the entire contents of which is incorporated herein by reference.

BACKGROUND OF THE INVENTION

1. Field of the Invention

Exemplary aspects of the present invention relate to an image forming apparatus, and more particularly, may relate to an image forming apparatus capable of allowing an easy operation of data while at least a minimum confidentiality is maintained.

2. Discussion of the Background

In recent years, information processing apparatuses are used in network systems. In such an information processing apparatus, the data transmission is performed at ease between devices connected to the network. Consequently, a structure which allows the data and the devices to be shared among a plurality of devices is common in terms of cost and usability.

However, in such a network system connecting a plurality of devices, information security may be vulnerable. As more of the information exchanged between the devices connected to the network becomes confidential, there are growing demands to prevent leakage of the information and illegal use of the devices.

In light of the above, various forms of restrictions need to be imposed on the information exchanged between devices by way of network when using an image forming apparatus, for example, a printer.

It is also necessary to impose restrictions on the use of input commands from an operation unit in the printer or an interface. In such a case where various information is administered while securing confidentiality, in most cases, an administrator or the like who is in charge of the administration of the information sets security policies and operates the information.

However, in spite of increasing the information security, there are many cases where an information processing apparatus which is incapable of supporting the security may have to coexist in the network system.

In light of the above, an image forming apparatus having a structure that allows coexistence of the information processing apparatus that does not support security may be necessary.

It is also necessary for the image forming apparatus to determine what operation to perform on data from such an information processing apparatus.

If the security is significantly enhanced when deciding the operations of the data, usability may, on the contrary, be deteriorated. Therefore, it may be necessary to take the usability into consideration when determining what operation to perform on the data.

According to Japanese Patent Laid-Open Application Publication No. 2005-149088, a data processing apparatus and a method of access control setting, an image processing system and method of controlling the image processing system that are capable of restricting access to an electronic document read by an image processing apparatus are proposed.

As described in Japanese Patent Laid-Open Application Publication No. 2004-289302, it is proposed that a database for user restrictions is provided on the network. An access authority to access different functions of the image forming apparatus is provided to each user of the database. Accordingly, not only are restrictions imposed on the use of devices, but restrictions are also imposed on the use of functions.

However, in the related arts, it may not be possible to perform detail settings such as a guest job and a public job. Thus, the level of convenience is relatively low. Furthermore, in the related arts, it may not be possible to perform detail settings for the access authority for each document.

SUMMARY OF THE INVENTION

In view of the foregoing, the exemplary embodiments of the present invention provide an image forming apparatus which requests authentication for login processing based on user information when a user requests specific processing. The image forming apparatus includes: a communication interface, a print mechanism, a registration mechanism, a storage mechanism and an administration mechanism.

The communication interface receives data. The print mechanism performs printing processing on data which is input through the communication interface. The registration mechanism registers a plurality of user information. The storage mechanism stores an access control list which registers a requested operation and an operation authorization for the requested operation with respect to each registered user. The administration mechanism is configured to administer login processing of a plurality of users based on hierarchy information of the registered users and registered contents of the access control list, and is configured to administer permission of the operation processing requested by the user. Even if the user instructs specific processing of data which is a guest job having no authentication information, the processing of the data is carried out.

In one exemplary embodiment of the above-mentioned image forming apparatus, a password is allowed to be changed in the access control list when the user information indicates a document administrator, and the password is not allowed to be changed when the user information indicates registered users other than the document administrator.

In one exemplary embodiment of the above-mentioned image forming apparatus, the access control list is changeable when the user information indicates the document administrator.

In one exemplary embodiment of the above-mentioned image forming apparatus, a public attribute which allows all registered users to operate is set in the data.

The above-mentioned image forming apparatus further includes an access control list which registers the requested operation and the operation authorization for the requested operation with respect to data in which the public attribute is set for each registered user.

At least one exemplary embodiment of the present invention provides a method of requesting authentication for login processing based on user information when a user requests a specific processing. The method includes: receiving data, performing printing processing on data which is input through the communication interface, registering a plurality of user information, storing an access control list which registers a requested operation and an operation authorization for the requested operation with respect to each registered user, and administering login processing of a plurality of users based on hierarchy information of the registered users and registered contents of the access control list, and administering permission of the operation processing requested by the user. Even if the user instructs specific processing of data which is a guest job having no authentication information, the processing of the data is carried out.

Additional features and advantages of the present invention will be more fully apparent from the following detailed description of example embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein:

FIG. 4A is a schematic diagram illustrating an example of an authorization setting table for different user levels according to one exemplary embodiment of the present invention;

FIG. 4B is a schematic diagram illustrating an example of an authorization setting table for different user attributes according to one exemplary embodiment of the present invention;

FIG. 4C is a schematic diagram illustrating an example of an authorization setting table for different jobs according to one exemplary embodiment of the present invention;

FIGS. 5A and 5B are schematic diagrams illustrating examples of an access control list of normal data according to one exemplary embodiment of the present invention;

FIGS. 6A through 6C are schematic diagrams illustrating examples of an access control list of guest job data according to one exemplary embodiment of the present invention;

FIG. 8A is a schematic diagram illustrating an example of header information of normal data according to one exemplary embodiment of the present invention;

FIGS. 8B and 8C are schematic diagrams illustrating examples of header information of guest job data according to one exemplary embodiment of the present invention;

FIGS. 9A and 9B are schematic diagrams illustrating examples of header information of public job data according to one exemplary embodiment of the present invention;

FIG. 10B is a schematic diagram illustrating an example of a screen for setting a guest job authority;

FIG. 10C is a schematic diagram illustrating an example of a screen for setting a public job authority;

FIG. 10D is a schematic diagram illustrating an example of a screen for setting a public job priority;

DETAILED DESCRIPTION OF EXEMPLARY EMBODIMENTS

Figure 1:
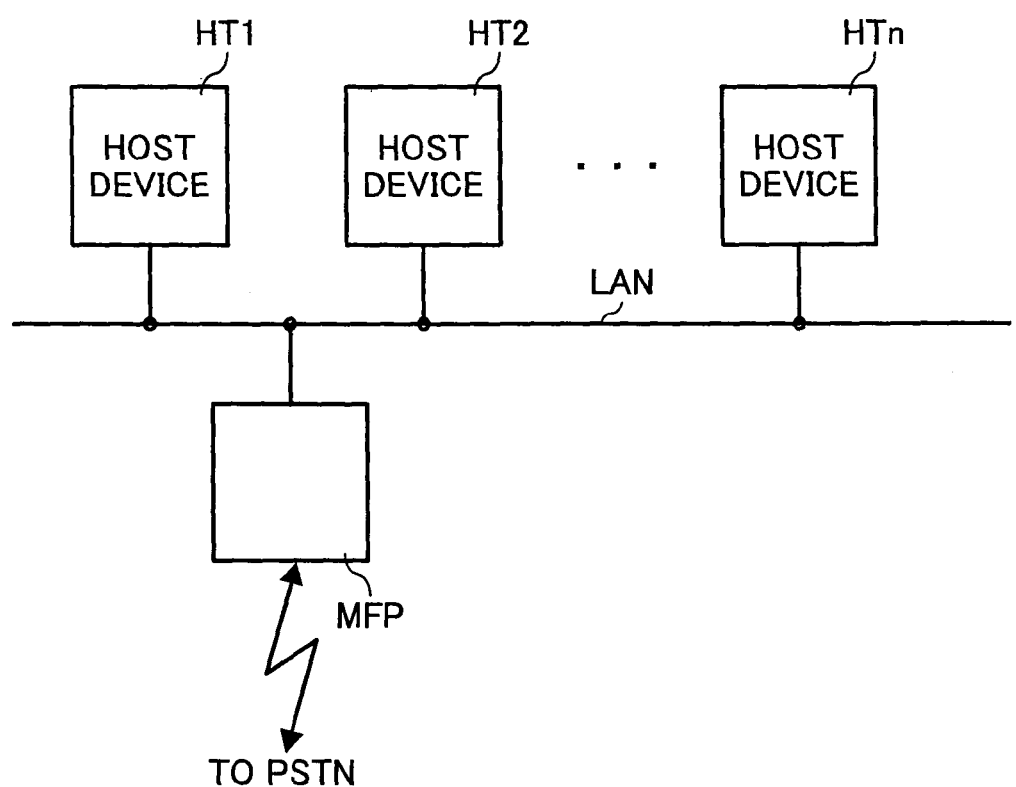
FIG. 1 is a block diagram illustrating a network system according to one exemplary embodiment of the present invention.

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on," "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures.

For example, if the device in the figures is turned over, elements described as "below" or "beneath" other elements or features would then be oriented "above" the other elements or features. Thus, a term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise.

It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Exemplary embodiments of the present invention are now explained below with reference to the accompanying drawings. In the later described comparative example, exemplary embodiment, and alternative example, the same reference numerals will be given to constituent elements such as parts and materials having the same functions, and the descriptions thereof will be omitted.

With reference to FIG. 1, a description will be provided of a network system of one exemplary embodiment of the present invention.

In FIG. 1, a plurality of host devices HT1 through HTn and a multi-functional printer (hereinafter referred to as MFP) which is network compatible are connected to a local area network (hereinafter referred to as LAN).

Furthermore, various kinds of programs, for example, an application software for creating documents, a printer driver for network which may send a print job to the MFP through the LAN, and so forth are introduced to the host devices HT1 through HTn, and are used by a specific user or by a plurality of specific users.

The MFP is equipped with various kinds of functions, for example, a network print function, an electronic mail processing function, a Group 3 facsimile transmission function, and so forth.

The network print function allows printing of the print job data received from the host devices HT1 through HTn by way of the local area network LAN. The electronic mail processing function allows for exchanging of image information, various kinds of documents and so forth by means of an electronic mail.

The Group 3 facsimile transmission function allows connecting to an analogue public switched telephone network (hereinafter referred to as analogue PSTN) so as to perform an image transmission using the PSTN in accordance with a Group 3 facsimile transmission procedure.

The MFP performs authentication of a user and provides an operation authority to each respective user so that the user may perform authorized operations.

Figure 2:
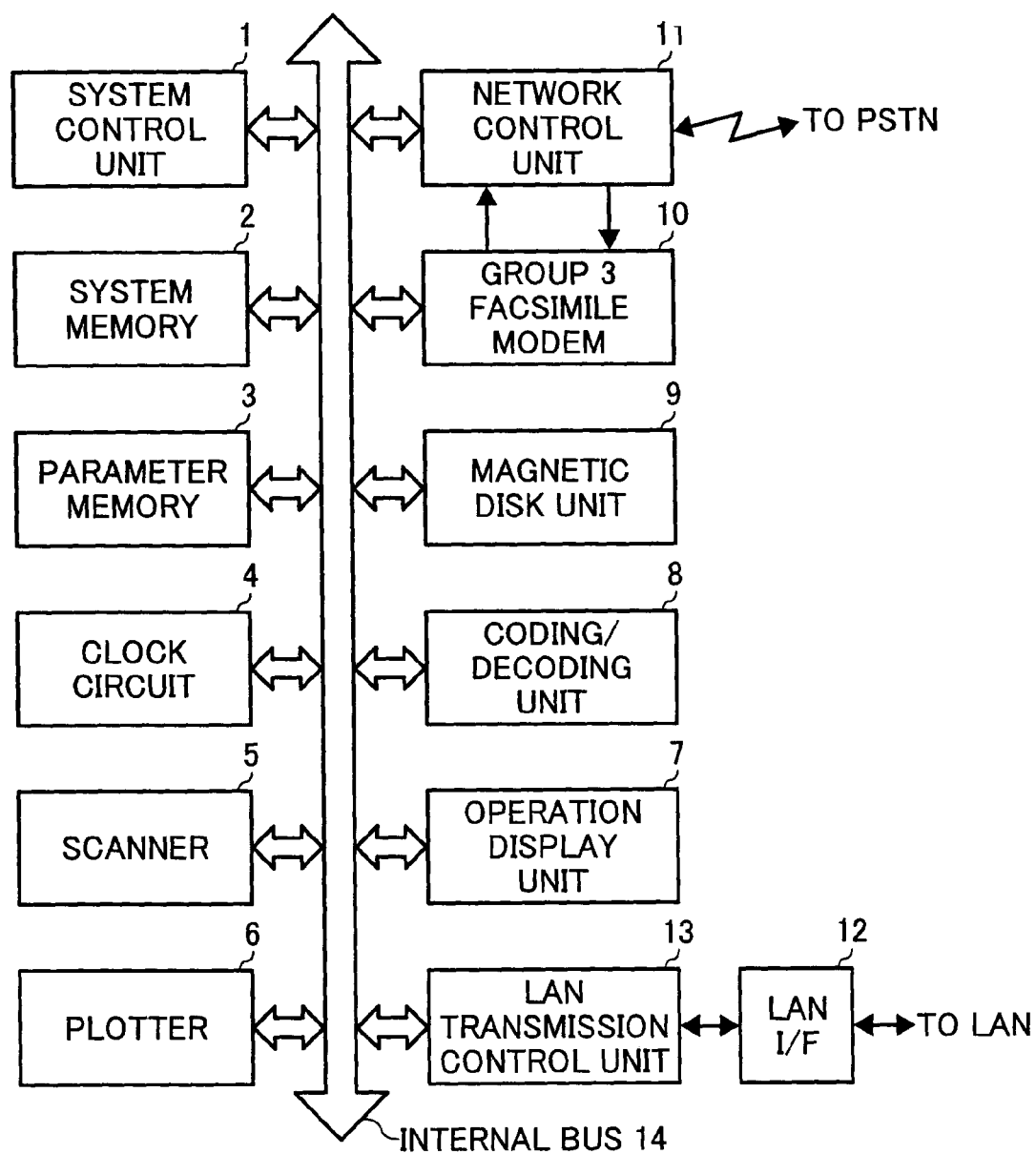
FIG. 2 is a block diagram illustrating an example structure of a network-compatible multi-functional printer (hereinafter referred to as MFP) according to one exemplary embodiment of the present invention.

FIG. 2 illustrates an exemplary structure of the network-compatible MFP.

In FIG. 2, a system control unit 1 performs various kinds of control processing including control processing of each unit of the MFP, control processing of the network print function, and processing of the facsimile transmission control procedure.

A system memory 2 stores control processing programs which are carried out by the system control unit 1, and various kinds of necessary data when carrying out the processing programs. The system memory 2 also constitutes the work area of the system control unit 1.

A parameter memory 3 stores various information specific to the MFP. A clock circuit 4 outputs information on the current time.

A scanner 5 reads a document image at a predetermined resolution. A plotter 6 prints out an image at a predetermined resolution. An operation display unit 7 is equipped with various control keys and various display units so as to control the MFP.

A coding/decoding unit 8 codes and compresses image signals, and decodes the compressed coded image information into the original image signals. A magnetic disk unit 9 stores image information in a coded and compressed state, the print job data, various information registered in the system, and so forth.

A Group 3 facsimile modem 10 realizes a modem function of the Group 3 facsimile, and is equipped with a low-speed modem function (V.21 modem) to exchange transmission procedure signals and a high-speed modem function (for example, V.17 modem, V.34 modem, V.29 modem V.27ter modem) to mainly exchange image information.

A network control unit 11 connects the MFP to the analogue PSTN and is equipped with an automatic sending-receiving function. A local area network interface circuit 12 connects the MFP to the LAN. The local area network transmission control unit 13 carries out communication control processing of various types of predetermined protocol suites for exchanging various data between other data terminal devices by way of the LAN.

As shown in FIG. 2, the system control unit 1, the system memory 2, the parameter memory 3, the clock circuit 4, the scanner 5, the plotter 6, the operation display unit 7, the coding/decoding unit 8, the magnet disk unit 9, the Group 3 facsimile modem 10, the network control unit 11 and the local area network transmission control unit 13 are connected to an internal bus 14. The exchange of data between each of the elements is performed by way of the internal bus 14.

However, the data exchange between the network control unit 11 and the Group 3 facsimile modem 10 is directly performed.

In the exemplary embodiments, the data exchange between the terminals connected to the LAN is performed using a combination of a transmission protocol up to a transport layer so-called TCP/IP (transmission control protocol/internet protocol) and a communication protocol which is an upper layer protocol. In other words, the protocol suites are applied to the data exchange between the terminals connected to the LAN.

Figure 3A:
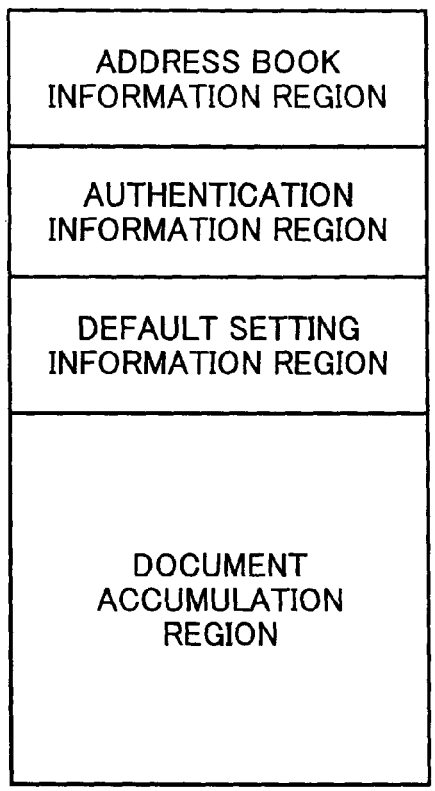
FIG. 3A is a schematic diagram illustrating an example structure of a storage region of a magnetic disk unit according to one exemplary embodiment of the present invention.

As shown in FIG. 3A, the storage region of the magnet disk unit 9 of the MFP is divided into, for example, an address book information region, an authentication information region, a default setting information region, and a document accumulation region.

The address book information region stores information on the address book. The authentication information region stores authentication information necessary for the user authentication. The default setting information region stores various types of default setting information necessary for the operation of the apparatus. The document accumulation region accumulates document information such as the print job data and the sending-receiving image information.

Figure 3B:
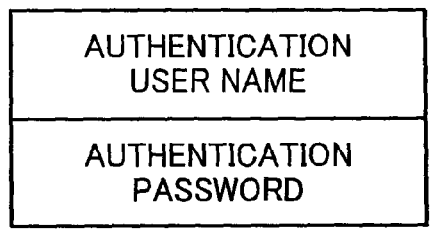
FIG. 3B is a schematic diagram illustrating an example of authentication information in an authentication information region according to one exemplary embodiment of the present invention.

In the authentication information region, the authentication information on a number of registered users is registered. An example of the authentication information is shown in FIG. 3B.

In this case, the authentication information includes registered authentication user names and authentication passwords registered along with the respective authentication user names.

Figure 3C:
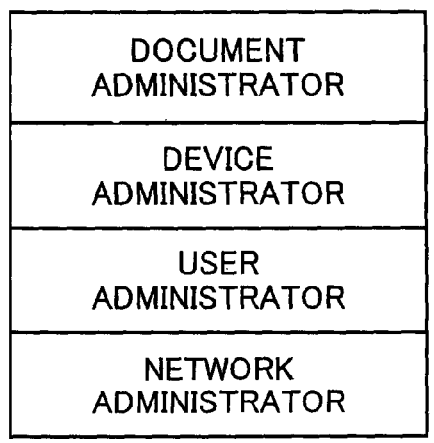
FIG. 3C is a schematic diagram illustrating an example of an administrator information table in a default setting region according to one exemplary embodiment of the present invention.

In the default setting information region, an administrator information table as shown in FIG. 3C, for example, is stored. User names of a document administrator, a device administrator, a user administrator, and a network administrator are registered in the administrator information table. The authentication user names may be used.

The default setting information region also registers an authorization setting table for different user levels as shown in FIG. 4A, an authorization setting table for different user attributes as shown in FIG. 4B, and an authorization setting table for jobs as shown in FIG. 4C.

FIG. 4A is an authorization setting table for different user levels. As shown in FIG. 4A what operation is permitted for each LEVEL 1, 2, 3 and 4 is registered in the authorization setting table for different user levels.

In FIG. 4A, an operation indicated by YES is an operation which is permitted; whereas, an operation indicated by NO is an operation which is not permitted. In FIG. 4A, the operations include, for example, BROWSE BIBLIOGRAPHIC INFORMATION, PRINT, CHANGE DOCUMENT NAME, DELETE, CHANGE DOCUMENT PASSWORD and SET ACL.

ACL is an abbreviation of Access Control List described later.

FIG. 4B is an authorization setting table for different user attributes. As shown in FIG. 4B, what operation is permitted in terms of an owner attribute and a document administrator attribute is registered in the authorization setting table for the user attributes. The owner herein refers to a person who creates a job. An operation indicated by YES is an operation which is permitted, whereas, an operation indicated by NO is an operation which is not permitted.

FIG. 4C is an authorization setting table for different jobs. As shown in FIG. 4C, what user attribute or operation authorization each user has in terms of a guest job, which is a job having no authentication information such as authorized user names and passwords, and in terms of a public job, which is a shared job having the public attribute, is registered in the authorization setting table for the jobs.

In the authorization setting table for different jobs as shown in FIG. 4C, it is registered in terms of the guest job that, for example, all users have the owner attribute, and the document administrator has the document administrator attribute.

In terms of the public job shown in FIG. 4C, it is registered that, for example, all users have a read attribute, the owner has the owner attribute, and the document administrator has the document administrator attribute.

In terms of the owner attribute and the document administrator attribute, authorizations are set on the operable operations in the authorization setting table for different user attributes shown in FIG. 4B.

The read attribute is an operation attribute that allows reading document data, however, it does not allow operations such as editing or updating, including changing and deleting.

In the exemplary embodiments, an access control list (ACL), in which the content of the operation setting permitted to each user is registered, is formed for each of a normal data document (hereinafter referred to as normal data) and a guest job data document (hereinafter referred to as guest job data). The normal data refers to data other than the guest job and the public job. The normal data is also data to which a user ID and a password are provided.

The access control lists are stored in the default setting information region of the magnetic disk unit 9.

FIGS. 5A and 5B illustrate an example of the access control list of the normal data. FIG. 5A illustrates a default value of the access control list of the normal data, and LEVEL 1 is registered for all users.

Each user may make a request to the document administrator for permission to perform the operation that he or she wishes to perform so that the authorization level may be reset. For example, when a user having the document administrator attribute (hereinafter referred to simply as a document administrator) receives a request from a user, the document administrator may modify the access control list of the normal data, accordingly, as shown in FIG. 5B, for example.

FIGS. 6A through 6C illustrate examples of the access control list of the guest job data. As will be described later, in terms of the public job data, the same operation level is uniformly provided to all users. The operation authorization information on the public job data is stored in the default setting information region.

Figure 7A:
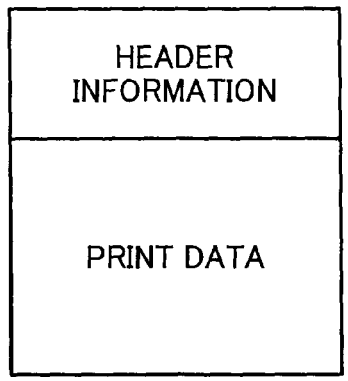
FIG. 7A is a schematic diagram illustrating an example of print job data according to one exemplary embodiment of the present invention.

FIG. 7A is a diagram illustrating the print job data. As shown in FIG. 7A, the print job data is formed of header information and print data. The print job data is created by the network-compatible printer driver of the host apparatuses HT1 through HTn and is sent by way of the local area network LAN.

Figure 7B:
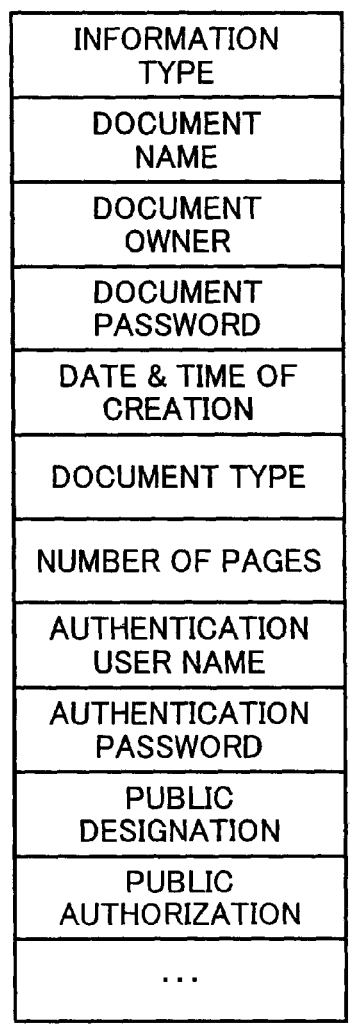
FIG. 7B is a schematic diagram illustrating an example of header information of the print job data of FIG. 7A.

As shown in FIG. 7B, the header information includes: an information type which indicates an attribute of the print data; a document name provided to the print data; a document owner or a user name who created the print data; a document password which is requested when processing the print data, date and time of document creation; a document type of the print data; the number of pages; an authentication user name used for authentication of the MFP; an authentication password used for authentication of the MFP; a public designation which indicates whether or not the print data is designated as the public job; a public authorization which indicates a user authorization in a case of the public job; and other appropriate information elements.

Referring now to FIG. 8A, there is shown an example of the header information of the normal data. In terms of the normal data, all the information elements other than the information element associated with the public document are registered.

FIG. 8B illustrates an example of the header information of the guest job without a document password.

FIG. 8C illustrates an example of the guest job header information with a document password. In terms of the guest job data, the authentication user name and the authentication password are not registered.

Referring now to FIG. 9A, there is shown an example of the header information of the public job data without the public authorization.

FIG. 9B illustrates another example of the header information of the public data with the public authorization. In terms of the public job data, when compared with the normal data, the information associated with the public document is added and registered.

Figure 10A:
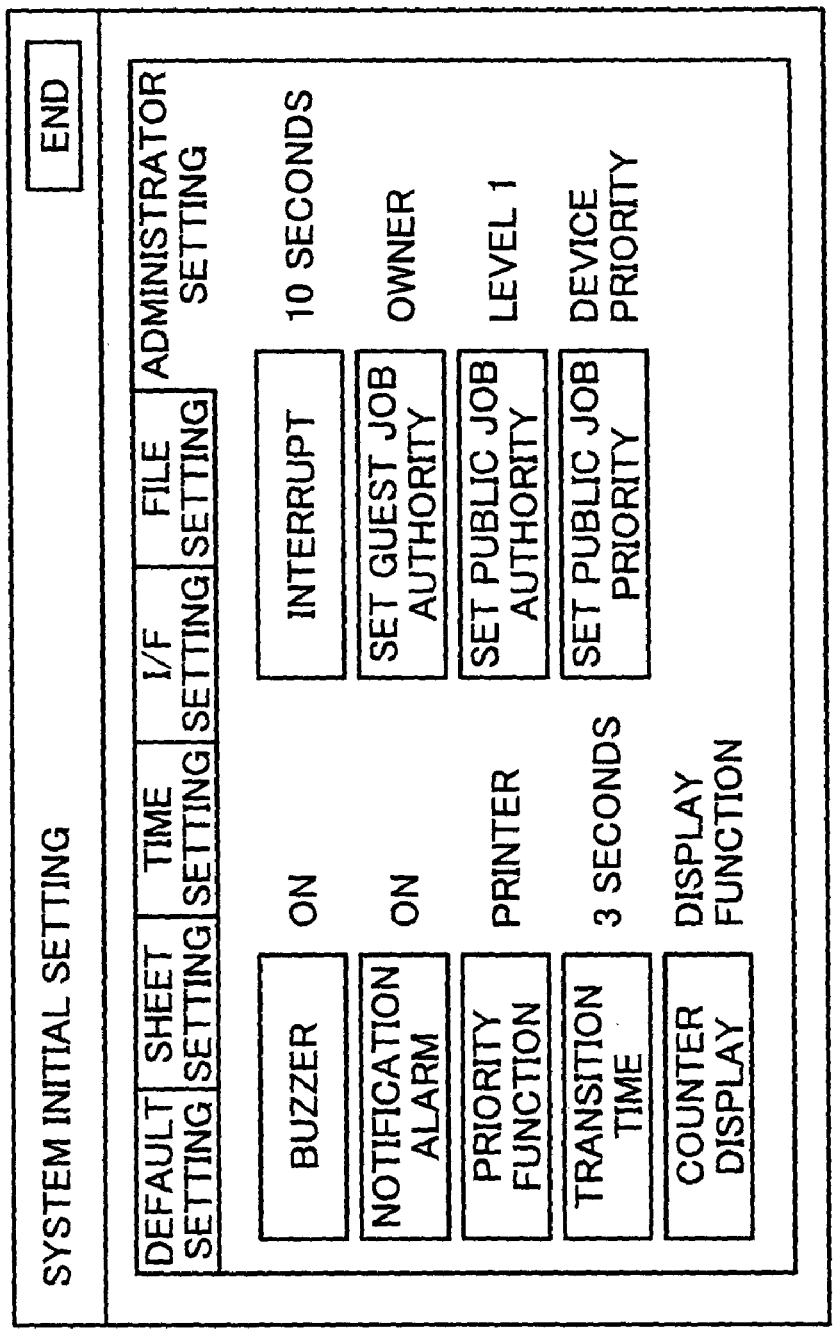
FIG. 10A is a schematic diagram illustrating an example of a screen for a system initial setting.

Referring now to FIG. 10A, there is shown an example of a system initial setting screen. The system initial setting screen shown in FIG. 10A displays a screen for "ADMINISTRATOR SETTING."

On this screen, control items such as "BUZZER," "NOTIFICATION ALARM," "PRIORITY FUNCTION," "TRANSITION TIME," "COUNTER DISPLAY," "INTERRUPT," "SET GUEST JOB AUTHORITY," "SET PUBLIC JOB AUTHORITY," and "SET PUBLIC JOB PRIORITY" are displayed as button elements. Furthermore, values set for each respective control item are displayed in the area near the respective button elements.

When the "SET GUEST JOB AUTHORITY" button is selected on the system initial setting screen, a screen for the guest job authority setting as shown in FIG. 10B is displayed, for example.

On this screen, the guest job authority level may be selected from five different types: LEVEL 1, LEVEL 2, LEVEL 3, LEVEL 4 and OWNER. A "CANCEL" button in FIG. 10B is an operation button for canceling a current selection. A "SET" button is an operation button for setting the current selection.

When the "SET PUBLIC JOB AUTHORITY" button is selected on the system initial setting screen, a screen for the public job authority setting as shown in FIG. 10C is displayed, for example.

On this screen, the public job authority level may be selected from five different types: LEVEL 1, LEVEL 2, LEVEL 3, LEVEL 4 and ENTIRE CONTROL which permits all the controls. A "CANCEL" button in FIG. 10C is an operation button for canceling the current selection. A "SET" button is an operation button for setting the current selection.

When the "SET PUBLIC JOB PRIORITY" button is operated on the system initial setting screen, a screen for the public job priority setting shown in FIG. 10D is displayed.

On this screen, the priority of the public authorization may be selected from "DEVICE PRIORITY" or "DRIVER PRIORITY" which provides the priority to the content of the header information at a time of receipt of data. A "CANCEL" button in FIG. 10D is an operation button for canceling a current selection. A "SET" button is an operation button for setting the current selection.

In a case where the value of the public job priority setting is set to "DEVICE PRIORITY," the operation authority information on the public job data stored in the default setting information region is referred so as to process the public job data.

In a case where the value of the public job priority setting is set to "DRIVER PRIORITY," the public job data is processed in accordance with the value of the public authorization information element included in the header information of the received print job data.

In practice, the content of the header information of the stored print job data is referenced and is processed. In a case where the value of the public job priority setting is set to "DEVICE PRIORITY," the value of the public authority information element in the header information may be rewritten to the value of the operation authorization information of the public job data stored in the default setting information region.

Figure 11:
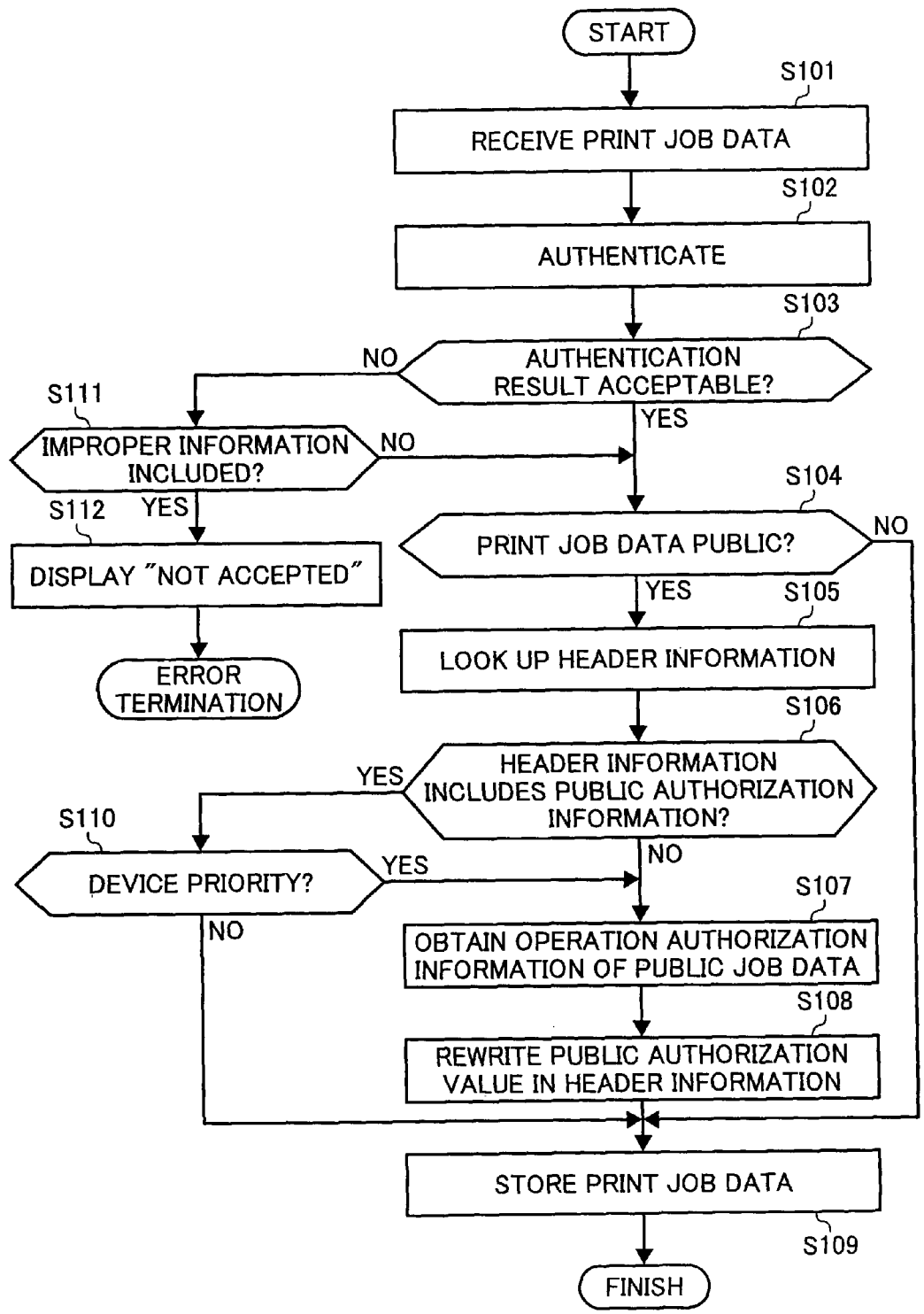
FIG. 11 is a flowchart showing an exemplary procedure of processing of a network-compatible apparatus when receiving the print job data from one of the host devices via the local area network.

Referring now to FIG. 11, there is shown an example procedure of the processing of the network-compatible MFP when receiving the print job data from one of the host devices HT1 through HTn by way of the local area network LAN.

When receiving the print job data in Step S101, a predetermined authentication operation is performed using an authentication user name and an authentication password in the header information in Step S102. Whether or not the authentication result is acceptable is determined in Step S103.

When the authentication result is determined as acceptable (YES in Step S103), whether or not the print job data is designated as public is determined by looking up the public designation in the header information in Step S104. When the print job data is designated as public (YES in Step S104), whether or not the header information includes the public authorization information is looked up in Step S105.

When the header information does not include the public authorization information (NO in Step S106), the value of the operation authorization information of the public job data stored in the default setting information region is obtained in Step S107.

Subsequently, the value of the public authorization in the header information is rewritten in Step S108. Then, the print job data is stored in a predetermined region of the magnetic disc unit 9 in Step S109.

When the public authorization information is included in the header information (YES in Step S106), whether or not the value of the public job priority setting is "DEVICE PRIORITY" is determined in Step S110.

When the value of the public job priority setting is determined to be "DEVICE PRIORITY" (YES in Step S110), the process advances to Step S107 where the public authorization information is obtained. Subsequently, the header information is rewritten in Step S108, and the subsequent processing is performed accordingly.

On the other hand, when the value of the public job priority setting is determined not to be "DEVICE PRIORITY" (NO in S110), the process advances to Step S109 where the print job data is stored in the predetermined region of the magnetic disc unit 9.

In a case where the print job data is not a public job, and the result is NO in Step S104, the process advances to Step S109 where the print job data is stored in the predetermined region of the magnetic disc unit 9.

In a case where the authentication result is NOT GOOD (NG) (NO in Step S103), whether or not the reason for the authentication result being determined as NG is due to an improper value of the authentication user name and the authentication password is determined in Step S111.

When the result is YES in Step S111, that is, the value of the authentication user name and the authentication password is improper, "NOT ACCEPTED" is displayed in Step S102. Subsequently, the processing is terminated (error termination).

In a case of the guest job, the result is NO in Step S11, because the value of the authentication user name and the authentication password is not included. In such a case, the process advances to Step S104, and the subsequent processing is performed.

Figure 12:
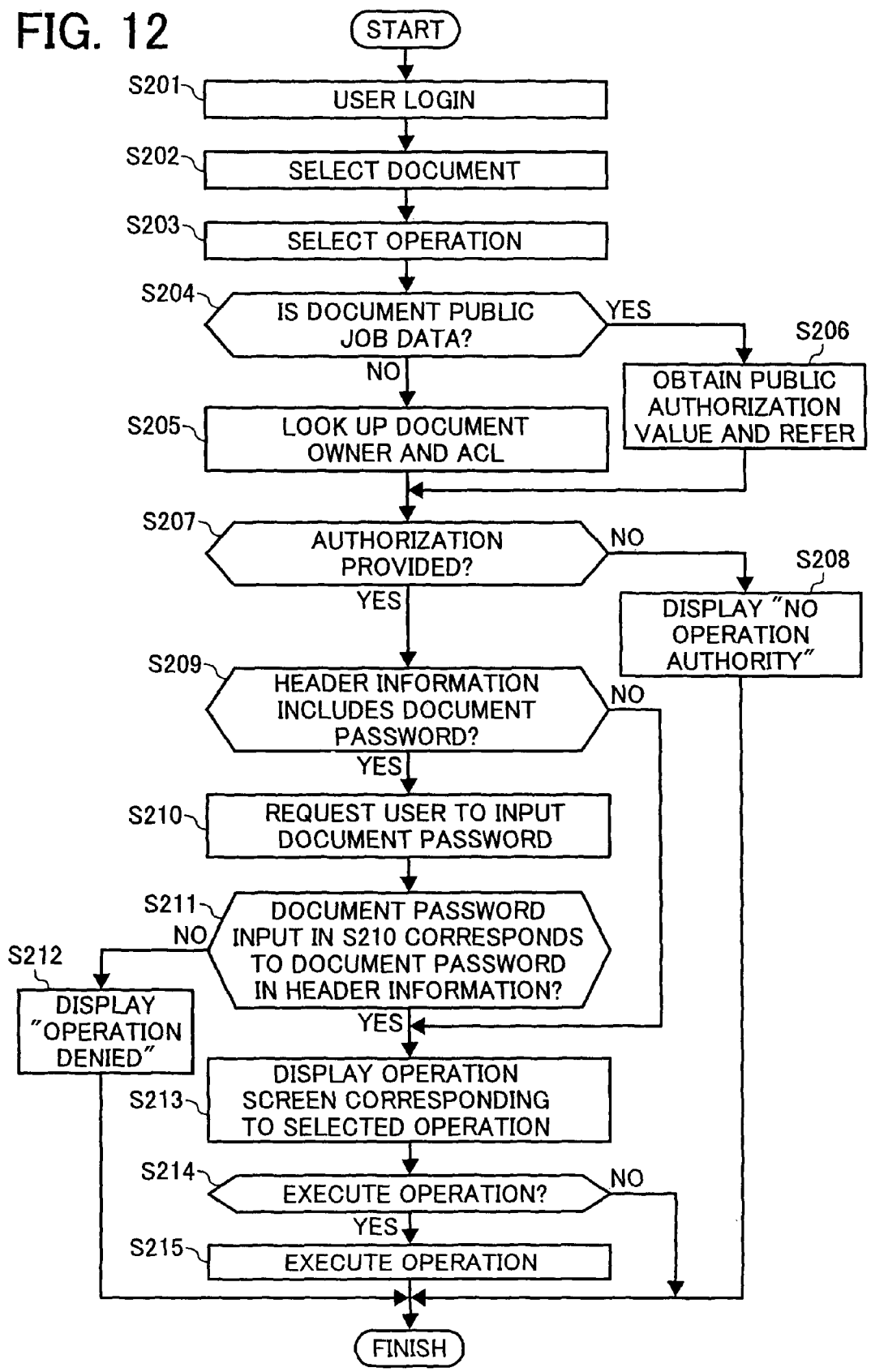
FIG. 12 is a flowchart showing an exemplary procedure of processing of the network-compatible apparatus when a user operates a document stored in the magnetic disc unit.

Referring now to FIG. 12, there is shown an exemplary procedure of the network-compatible MFP in a case where a user operates a document stored in the magnetic disc unit 9.

First, a user login is performed in Step S201. When the user login is appropriately finished, the user may select a document to operate from the stored documents in Step S202, and then the user may select an operation to perform in Step S203.

In Step 204, whether or not the document selected from the stored documents is the public job data is determined by looking up the header information of the document.

When the result is NO in Step S204, and the header information of the document does not include the authentication user name and the authentication password, the document owner and the access control list or the ACL (guest job data) are referred so as to determine whether or not the user has the authority to perform the selected operation.

When the header information of the document includes the authentication user name and the authentication password, the document owner and the access control list (ACL) of normal data are referred so as to determine whether or not the user has the authority to perform the selected operation in Step S205.

When the result is YES in Step S204, the value of the public authorization in the header information is obtained and is referred so as to determine whether or not the user has the authority to perform the selected operation in Step S206.

When it is determined that the user does not have the authority (NO in Step S207) based on the results in Step S205 and Step S206, a display notifying "NO OPERATION AUTHORITY" is output to the operation display unit 7 in Step S208. Subsequently, the operation is finished.

When it is determined that the user has the authority (YES in Step S207), whether or not the header information contains a document password is determined in Step S209.

When the result is YES in Step S209, the user is requested to enter the document password in Step S210. Subsequently, whether or not the password being entered corresponds to the document password in the header information is checked in Step S211.

When the result is NO in Step S211, a display notifying "OPERATION DENIED" is output to the operation display unit 7 in Step 212. Subsequently, the operation is finished.

When the result is YES in Step 211 or when the result is NO in Step S209, that is, when the header information is not provided with the document password, an operation screen corresponding to the selected operation is displayed in Step S213 so that the user may operate, accordingly.

When an operation is instructed (YES in Step S214), the instructed operation is carried out in Step S215. When the result is NO in Step S214, the processing is finished at this point.

According to the exemplary embodiments described above, any user who is allowed to use the apparatus may carry out all operations with respect to received data while a minimum level of confidentiality is secured.

Furthermore, not all the users are allowed to change passwords which may easily affect the confidentiality. Accordingly, a higher level of security may be maintained.

Not all the users allowed to use the apparatus are allowed to change the access control list. Accordingly, a higher level of security is maintained.

In addition, data may be shared among all registered users. However, the users are not provided with the authorization to perform all operations relative to the data. Instead, the users are provided with minimum authorizations such as a browsing authorization and print authorization. Accordingly, data may be shared and operated, while maintaining high security.

With regards to the authorization to operate the public job data, it is possible to select either providing the priority to the setting of the device side or to the setting of the driver of the host devices HT1 through HTn. Accordingly, even if both settings are designated, the operation may be smoothly carried out.

In the exemplary embodiments, descriptions are given of a case in which the present invention is applied to a network-compatible multi-functional printer (MTF). However, without limiting to the MTF, the present invention may be applied to any network-compatible image forming apparatus.

One or more embodiments of the present invention may be conveniently implemented using a conventional general purpose digital computer programmed according to the teachings of the present specification. Appropriate software coding can readily be prepared by programmers based on the teachings of the present disclosure. One or more embodiments of the present invention may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods, when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of a built-in medium include, but are not limited to, rewriteable non-volatile memories, such as ROMs and flash memories, and hard disks. Examples of a removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image forming apparatus which requests authentication for login processing based on user information when a user requests specific processing, comprising:
    a communication interface configured to receive data;
    a print mechanism configured to perform printing processing on data for printing which is input through the communication interface;
    a registration mechanism configured to register user information for a plurality of registered user types;
    a first storage mechanism configured to store an access control list which registers a requested operation and an operation authorization for the requested operation with respect to each registered user type, and to store default setting information for operation of the image forming apparatus;
    an administration mechanism configured to administer login processing of a plurality of users based on hierarchy information of the registered user types and registered contents of the access control list, and to administer permission of the operation processing requested by the user;
    a determining mechanism configured, when public job authority information is included in header information of the data for printing that is input through the communication interface, to determine if a public job priority setting is set to preferentially retrieve data from the image forming apparatus;
    a retrieval mechanism configured, when public job authority level information is not included in header information of the data for printing that is input through the communication interface or when the determining mechanism determines that the public job priority setting is set to preferentially retrieve data from the imager forming apparatus, to retrieve image forming apparatus public job authority level information from the default setting information stored in the storage mechanism;
    a rewrite mechanism configured, when the image forming apparatus public job authority level information is retrieved from the image forming apparatus, to rewrite the public job authority level information in the header information of the data for printing to the image forming apparatus public job authority level information retrieved from the default setting information in the storage mechanism; and
    a second storage mechanism configured to store the data for printing.

2. The image forming apparatus according to claim 1, wherein a password is allowed to be changed in the access control list when the user information indicates a document administrator, and the password is not allowed to be changed when the user information indicates registered users other than the document administrator.

3. The image forming apparatus according to claim 2, wherein the access control list is changeable when the user information indicates the document administrator.

4. The image forming apparatus according to claim 1, wherein a public attribute which allows all registered users to operate is set in the data.

5. The image forming apparatus according to claim 4 further comprising:
   an access control list configured to register the requested operation and the operation authorization for the requested operation with respect to data in which the public attribute is set for each registered user.

6. A method of requesting authentication for login processing based on user information when a user requests a specific processing, the method comprising:
   receiving data for printing through a communication interface;
   performing printing processing on the data for printing;
   registering user information for a plurality of registered user types;
   storing an access control list which registers a requested operation and an operation authorization for the requested operation with respect to each registered user;
   storing default setting information for operation of an image forming apparatus;
   administering login processing of a plurality of users based on hierarchy information of the registered user types and registered contents of the access control list, and administering permission of the operation processing requested by the user;
   when public job authority level information is included in header information of the data for printing that is input through the communication interface, determining whether a public job priority setting is set to preferentially retrieve data from the image forming apparatus;
   when the public job authority level information is not included in the header information of the data for printing that is input through the communication interface or when it is determined that the public job priority setting is set to preferentially retrieve data from the image forming apparatus, retrieving image forming apparatus public job authority level information from the stored default setting information of the image forming apparatus;
   when the image forming apparatus public job authority level information is retrieved from the image forming apparatus, rewriting the public job authority level information in the header information of the data for printing to the image forming apparatus public job authority level information retrieved from the stored default setting information of the image forming apparatus; and
   storing the data for printing.

* * * * *